United States Patent [19]

Li et al.

[11] Patent Number: 5,855,647
[45] Date of Patent: Jan. 5, 1999

[54] PROCESS FOR RECOVERING SF6 FROM A GAS

[75] Inventors: Yao-En Li, Buffalo Grove, Ill.; Magdy Meimari, Quebec, Canada

[73] Assignee: American Air Liquide, Inc., Walnut Creek, Calif.

[21] Appl. No.: 856,756

[22] Filed: May 15, 1997

[51] Int. Cl.[6] .......................... B01D 53/22; B01D 53/68
[52] U.S. Cl. .......................... 95/45; 95/47; 95/51; 95/52; 95/54; 95/132; 95/287; 423/155; 423/240 R
[58] Field of Search .................... 95/45, 47, 51, 95/52, 54, 233, 273, 287, 132, 278, 286; 423/155, 165, 240 R, 241

[56] References Cited

U.S. PATENT DOCUMENTS

| | | | |
|---|---|---|---|
| 2,947,687 | 8/1960 | Lee | 210/23 |
| 2,953,502 | 9/1960 | Binning et al. | 202/12 |
| 2,960,462 | 11/1960 | Lee et al. | 208/308 |
| 2,970,106 | 1/1961 | Binning et al. | 208/347 |
| 3,508,994 | 4/1970 | Nyrop | 156/280 |
| 3,616,607 | 11/1971 | Klass et al. | 55/16 |
| 3,648,845 | 3/1972 | Riley | 210/490 |
| 4,086,310 | 4/1978 | Bottenbruch et al. | 264/41 |
| 4,113,628 | 9/1978 | Alegranti | 210/500 |
| 4,132,824 | 1/1979 | Kimura et al. | 428/516 |
| 4,155,793 | 5/1979 | Salemme et al. | 156/246 |
| 4,156,597 | 5/1979 | Browall | 55/16 |
| 4,192,824 | 3/1980 | Robinson et al. | 585/409 |
| 4,378,324 | 3/1983 | Makino et al. | 364/41 |
| 4,460,526 | 7/1984 | Makino et al. | 264/41 |
| 4,474,662 | 10/1984 | Makino et al. | 264/41 |
| 4,485,056 | 11/1984 | Makino et al. | 264/41 |
| 4,512,893 | 4/1985 | Makino et al. | 210/500 |
| 4,602,922 | 7/1986 | Cabasso et al. | 55/158 |
| 4,664,669 | 5/1987 | Ohyabu et al. | 623/66 |
| 4,689,267 | 8/1987 | Takamizawa et al. | 428/376 |
| 4,713,292 | 12/1987 | Takemura et al. | 428/373 |
| 4,714,481 | 12/1987 | Matsuura et al. | 55/158 |
| 4,717,394 | 1/1988 | Hayes | 55/158 |
| 4,717,395 | 1/1988 | Chiao | 95/51 |
| 4,741,829 | 5/1988 | Takemura et al. | 210/500 |
| 4,756,932 | 7/1988 | Puri | 427/175 |
| 4,826,599 | 5/1989 | Bikson et al. | 210/500 |
| 5,009,869 | 4/1991 | Weinberg et al. | 95/45 X |
| 5,085,676 | 2/1992 | Ekiner et al. | 55/158 |
| 5,234,471 | 8/1993 | Weinberg | 95/47 |
| 5,248,319 | 9/1993 | Ekiner et al. | 95/54 |
| 5,282,969 | 2/1994 | Xu | 95/54 X |
| 5,378,263 | 1/1995 | Prasad | 95/45 X |
| 5,482,539 | 1/1996 | Callahan | 95/45 X |
| 5,503,657 | 4/1996 | Bouard et al. | 95/45 |

FOREIGN PATENT DOCUMENTS 61-187918  8/1986  Japan ......................... 95/52

OTHER PUBLICATIONS

Carson, William M.; Christian, Kimberly A.; Crossland, Eugene C.; Hsiung, Thomas H.; Ridgeway, Robert G.; and Yang, James H. "Large Scale PFC Capture System." (Air Products and Chemicals, Inc.) Presented at SEMICON Southwest, Austin, TX., Oct. 13, 1997.

Stannett, V.; and Williams, J.L. "The Permeability of Poly-(ethyl Methacrylate) to Gases and Water Vapor." *Journal of Polymer Science:* Part C, No. 10, pp. 45–49, (1965).

Norton, Francis J. "Gas Permeation through Lexan Polycarbonate Resin.": *Journal of Applied Polymer Science*, vol. 7, pp. 1649–1659, (1963).

*Primary Examiner*—Robert Spitzer
*Attorney, Agent, or Firm*—Burns, Doane, Swecker & Mathis, L.L.P.

[57] ABSTRACT

A process for recovering $SF_6$ from a gas is provided. The process includes the step of contacting a gas stream comprising $SF_6$ and at least one of $N_2$, $O_2$, $CO_2$, and $H_2O$ with a membrane in at least one membrane separation unit at conditions effective to obtain a retentate stream rich in $SF_6$ and a permeate stream rich in at least one of $N_2$, $O_2$, $CO_2$, and $H_2O$.

24 Claims, 6 Drawing Sheets

PROCESS FOR RECOVERING SF6 FROM A GAS

FIELD OF THE INVENTION

The present invention generally relates to a gas separation process. The invention particularly relates to a process for recovering $SF_6$ and/or $CO_2$ from a gas stream using membrane separation techniques. The invention also particularly relates to a process for forming solidified magnesium metal, which process includes recovering and/or recycling of $SF_6$ and/or $CO_2$.

BACKGROUND OF THE INVENTION

Magnesium is often formed into ingots, bars, sheets, or rods, and sold as a commercial product. Typically, the magnesium is given a particular shape by a casting process which involves melting the magnesium and pouring it into a mold.

Magnesium in the molten state, however, requires some form of protection to inhibit oxidation and to prevent burning. When molten magnesium is exposed to ambient air, a thick layer of magnesium oxide forms on the surface of the melt. However, this layer of magnesium oxide is not adequate to provide the necessary protection. In a matter of just seconds, many blooms form on the surface of the molten magnesium which first glow red and then burst into white flames. As a result, the MgO (on the surface) is not smooth or coherent with the molten surface. Moreover, MgO occupies much less volume than the metal from which it is formed. Thus, the entire surface of the molten magnesium that is exposed to ambient air is not protected. In addition, the boiling point of magnesium is relatively low. This results in a high vapor pressure which further puts critical demands on the MgO layer.

One solution to the oxidation problem has been to isolate the melt from the air with a non-reactive barrier consisting of a flux of salts (e.g., 50% $MgCl_2$, 25% KCl, 18% $BaCl_2$, 4% $CaF_2$, 3% MgO). The flux is liquid at the temperature of molten magnesium and has a surface tension that enables the flux to encase the melt with a relatively impermeable fluid film.

However, the use of a salt flux cover has a number of drawbacks. For example, it reduces the magnesium metal yield. The salt flux forms a sludge composed of oxides and inter-metallic particles. The sludge is generated by oxidation and agitation of the molten metal bath. Oxidation of the salt flux also produces dross floating on the metal surface. Both the sludge and the dross have a considerable amount of metallic magnesium trapped in their structure which reduces yield.

The sludge and dross also create other problems. For example, the sludge settles to the bottom of the pot where it may insulate and cause hot spots on the pot. Additionally, both present disposal problems. Flux can contaminate (e.g., corrosion effects) the finished castings by forming flux inclusions or oxides. Flux fumes and flux dust can also cause serious corrosion problems in the plant.

Another approach to solving the problem associated with molten magnesium is to use inhibitors in the air. The early practice was to burn coke or sulfur to produce the gaseous agent, $CO_2$ or $SO_2$. An atmosphere of $CO_2$ was found to be superior to the commonly used commercial atmospheres of $N_2$, Ar, or He because of the absence of vaporization of the magnesium, the absence of excessive reaction products, and the necessity for the enclosure above the molten metal to be extremely air tight. Some of these gases are also very expensive to use. Additionally, small amounts of $SO_2$ (<1%) was found to be sufficient for protecting the molten magnesium from burning, even if air and moisture are present in the atmosphere above the melt.

However, the use of these inhibitors also has several drawbacks. For example, both $CO_2$ and $SO_2$ pose pollution problems such as breathing discomfort for plant personnel, residual sludge disposal, and a corrosive atmosphere which is detrimental to both plant and equipment. Furthermore, $SO_2$ is toxic and can cause explosions.

While $BF_3$ has been mentioned as being a very effective inhibitor, it is not suitable for commercial processes because it is extremely toxic and corrosive.

Sulfur hexafluoride ($SF_6$) has also been mentioned as one of many fluorine-containing compounds that can be used in air as an oxidation inhibitor for molten magnesium. However, it was overlooked for many years. When its important dielectric properties were applied to electric equipment, it was tried as an inhibitor in die casting operations. $SF_6$ was discarded at that point, however, because of its severe attack on the ferrous equipment. In addition, the use of pure $SF_6$ for protecting molten magnesium has been reported to have caused explosions.

Later, it was found that at low concentrations of $SF_6$ in air (<1%), a protective thin film of MgO (and $MgF_2$) is formed on the magnesium melt surface. Advantageously, even at high temperatures in air, $SF_6$ showed negligible or no reactions.

However, the combination of $SF_6$ and air has some drawbacks. For example, since $SF_6$ is adsorbed by the thin film, there must be a continuous supply of the gas to maintain the otherwise unstable film. Moreover, at higher temperatures, higher concentrations of $SF_6$ are necessary. At the higher concentrations, $SO_2$ and $MgF_2$ are formed, and magnesium is wastefully further oxidized.

It was then found that $CO_2$ could be used together with $SF_6$ and air. A gas atmosphere of air, $SF_6$, and $CO_2$ has several advantages. First, it is non-toxic and non-corrosive. Second, it eliminates the use of salt fluxes and the need to dispose of the resulting sludge. Third, using such a gas atmosphere results in a lower metal loss, elimination of corrosion effects, and clean castings. Fourth, such a casting process provides a clean operation and improves the working conditions. In short, the addition of $CO_2$ provides much improved protection compared to the melt protection obtained with air/$SF_6$ mixtures.

However, using a gas atmosphere of $SF_6$ and $CO_2$ also has some disadvantages. Namely, both $SF_6$ and $CO_2$ have been mentioned as being greenhouse gases, i.e., they have a high global warming potential. In addition, $SF_6$ is a relatively expensive gas. Thus, there is a need in the art to reduce the total amount of $SF_6$ and $CO_2$ that is used and released into the atmosphere.

Accordingly, it is an object of the present invention to address this need in the magnesium industry. In particular, it is an object of the present invention to provide an efficient and economical process for recovering $SF_6$ and/or $CO_2$ from the vent gas of a magnesium foundry and optionally recycling the recovered gas. These and other objects of the invention will become apparent in light of the following specification, and the appended drawings and claims.

SUMMARY OF THE INVENTION

In one aspect, the present invention relates to a process for recovering $SF_6$ from a gas. The process includes the step of contacting a gas stream comprising $SF_6$ and at least one of $N_2$, $O_2$, $CO_2$, and $H_2O$ with a membrane in at least one membrane separation unit at conditions effective to obtain a retentate stream rich in $SF_6$ and a permeate stream rich in at least one of $N_2$, $O_2$, $CO_2$, and $H_2O$.

In one embodiment, the process according to the present invention involves separating $SF_6$ from $CO_2$. The process includes the step of contacting a gas stream comprising $SF_6$ and $CO_2$ with a membrane in two or more membrane separation units at conditions effective to obtain a retentate stream rich in $SF_6$ and a permeate stream rich in $CO_2$.

Preferably, the gas stream is contacted with a membrane in three membrane separation units. The gas stream is contacted with a first membrane in a first membrane separation unit at conditions effective to obtain a first retentate stream rich in $SF_6$ and a first permeate stream rich in $CO_2$. The first permeate stream is then contacted with a second membrane in a second membrane separation unit at conditions effective to obtain a second retentate stream depleted in $CO_2$ and a second permeate stream rich in $CO_2$. The first retentate stream is contacted with a third membrane in a third membrane separation unit at conditions effective to obtain a third retentate stream rich in $SF_6$ and a third permeate stream depleted in $SF_6$.

In another aspect, the present invention relates to a process for forming solidified Mg metal. The process includes the steps of:

(a) casting molten Mg metal in a gaseous atmosphere comprising $SF_6$;

(b) cooling the molten Mg metal to form a solidified Mg metal;

(c) obtaining a vent gas comprising $SF_6$ and at least one of $N_2$, $O_2$, $CO_2$, and $H_2O$ from the casting step; and (d) contacting the vent gas with a membrane in at least one membrane separation unit at conditions effective to obtain a retentate stream rich in $SF_6$ and a permeate stream rich in at least one of $N_2$, $O_2$, $CO_2$, and $H_2O$. Preferably, at least a portion of the retentate stream is recycled to the casting step to provide the gaseous atmosphere.

In one embodiment, the process for forming solidified Mg metal according to the present invention includes the steps of:

(a) casting molten Mg metal in a gaseous atmosphere comprising $SF_6$ and $CO_2$;

(b) cooling the molten Mg metal to form a solidified Mg metal;

(c) obtaining a vent gas comprising $SF_6$ and $CO_2$ from the casting step; and (d) contacting the vent gas with a membrane in two or more membrane separation units at conditions effective to obtain a retentate stream rich in $SF_6$ and a permeate stream rich in $CO_2$. Preferably, at least a portion of the retentate stream and at least a portion of the permeate stream are recycled to the casting step to provide the gaseous atmosphere.

In a particularly preferred embodiment, prior to being recycled, the permeate stream and the retentate stream are contacted with a second and third membrane, respectively, to improve the purity of those streams.

BRIEF DESCRIPTION OF THE DRAWINGS

The present invention will be described in greater detail with reference to the accompanying drawings in which like elements bear like reference numerals, and wherein.

DETAILED DESCRIPTION OF THE PREFERRED EMBODIMENTS

In a first aspect, the present invention relates to a process for recovering $SF_6$ from a gas. The process includes the step of contacting a gas stream comprising $SF_6$ and at least one of $N_2$, $O_2$, $CO_2$, and $H_2O$ with a membrane in at least one membrane separation unit at conditions effective to obtain a retentate stream rich in $SF_6$ and a permeate stream rich in at least one of $N_2$, $O_2$, $CO_2$, and $H_2O$.

As used in this specification and the claims, the term "rich" means that the concentration of a particular component in that stream is greater than the concentration of the same component in the feed stream to the particular process step. Likewise, the term "depleted" means that the concentration of a particular component in that stream is less than the concentration of the same component in the feed stream to the particular process step.

Preferably, the gas stream to be separated contains from about 0.0001 to about 20% by volume of $SF_6$, and the retentate stream contains from about 0.01 to about 100% by volume of $SF_6$.

Figure 1:
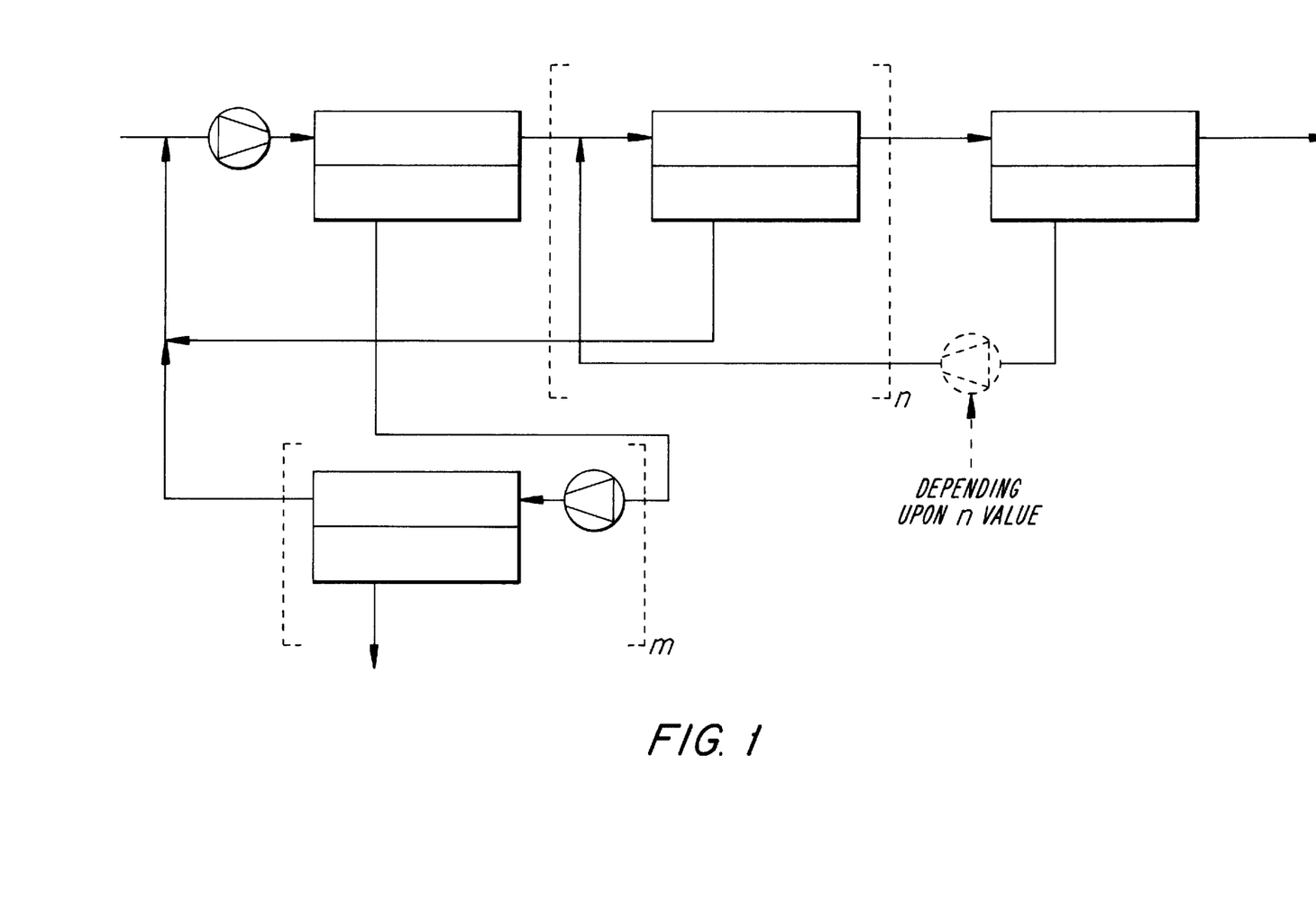
FIG. 1 illustrates an engineering design of a membrane system that can be employed in the present invention.

In a preferred embodiment, the purity of the permeate and retentate streams is improved by contacting the streams with additional membrane separation units arranged in series. Such a process may be carried out according to the multi-step membrane separation system shown in FIG. 1. As shown in FIG. 1, each of the permeate and retentate streams may be passed to another membrane contacting unit to increase the purity of the stream. The number of contacting steps "m" and "n" may vary depending on the purity desired. By using such a process, it is possible to obtain 100% recovery of $SF_6$ with a purity approaching 100% by volume.

Any membrane can be used in the process of the present invention so long as the membrane can selectively retain $SF_6$ while passing the other components in the gas stream through. The membrane should also be substantially non-reactive with the gaseous components to be separated.

Membranes suitable for use in the present invention include glassy membranes such as polymer membranes made preferably from polyimides; polyamides; polyamide-imides; polyesters polycarbonates; polysulfones; polyether-sulfone; polyetherketone; alkyl substituted aromatic polyesters; blends of polyethersulfone, aromatic polyimides, aromatic polyamides, polyamides-imides, fluorinated aromatic polyimide, polyamide, and polyamide-imides; glassy polymeric membranes such as those disclosed in U.S. Ser. No. 08/247,125 filed May 20, 1994, the content of which is hereby incorporated by reference; cellulose acetates; and blends thereof, copolymers thereof, substituted polymers (e.g. alkyl, aryl) thereof and the like.

Other membranes suitable for use in the present invention include asymmetric membranes. Asymmetric membranes are prepared by the precipitation of polymer solutions in solvent-miscible nonsolvents. Such membranes are typified by a dense separating layer supported on an anisotropic substrate of a graded porosity and are generally prepared in one step. Examples of such membranes and their methods of manufacture are disclosed in U.S. Pat. Nos. 4,113,628; 4,378,324; 4,460,526; 4,474,662; 4,485,056; 4,512,893; 5,085,676; and 4,717,394; all incorporated herein by reference. The '394 and '676 patents disclose preparation of asymmetric separation membranes from selected polyimides. Particularly preferred membranes are polyimide asymmetric gas separation membranes as disclosed in the '676 patent.

Yet other membranes suitable for use in the present invention include composite gas separation membranes. These membranes typically have a dense separating layer on a preformed microporous substrate. The separating layer and the substrate are usually different in composition. Composite gas separation membranes have evolved to a structure of an ultrathin, dense separating layer supported on an anisotropic, microporous substrate. These composite membrane structures can be prepared by laminating a preformed ultrathin dense separating layer on top of a preformed anisotropic support membrane. Examples of such membranes and their methods of manufacture are disclosed in U.S. Pat. Nos. 4,664,669; 4,689,267; 4,741,829; 2,947,687; 2,953,502; 3,616,607; 4,714,481; 4,602,922; 2,970,106; 2,960,462; 4,713,292; 4,086,310; 4,132,824; 4,192,824; 4,155,793; and 4,156,597; all incorporated herein by reference.

Alternatively, composite gas separation membranes may be prepared by multistep fabrication processes, wherein first an anisotropic, porous substrate is formed, followed by contacting the substrate with a membrane-forming solution. Examples of such methods are described in U.S. Pat. Nos. 4,826,599; 3,648,845; and 3,508,994; all incorporated herein by reference.

U.S. Pat. No. 4,756,932 describes how composite hollow-fiber membranes may also be prepared by co-extrusion of multiple polymer solution layers, followed by precipitation in a solvent-miscible nonsolvent.

In the case of hollow-fiber membranes, the term "membrane" as used in the present invention is intended to include both the individual hollow fibers as well as multiple hollow fibers.

The membrane used in the present invention can be post-treated with, or coated by, or co-extruded with, a fluorinated or perfluorinated polymer layer in order to increase its ability to withstand harmful constituents in the gas stream from which $SF_6$ is to be separated, at low levels or temporary contact with such components.

The temperature of the gas stream and/or the membrane during the contacting step in each membrane separation unit can vary from about $-10°$ C. to about $100°$ C. Preferably, the temperature is between about $10°$ C. and $80°$ C. More preferably, the temperature ranges from ambient, i.e., from about $20°$ C. to $25°$ C., to about $60°$ C.

It is preferred, according to the present invention, to have a pressure drop across the membrane in each membrane separation unit of less than about 2,000 psig. More preferably, the pressure drop ranges from about 3 to about 200 psig. Even more preferably, the pressure drop is about 20 to about 60 psig.

The requisite pressure drop across the membrane can be provided in one of two ways. First, the feed gas stream can be compressed. Preferred compressors are sealed and oil-free, such as the compressors sold under the tradename POWEREX, available from the Powerex Harrison Company of Ohio. Second and more preferably, the pressure drop across the membrane can be established by lowering the pressure on the permeate side of the membrane. To create the lower pressure on the permeate side, a vacuum pump or any other suction device can be used.

The flowrate of the gas stream across the membrane in each membrane separation unit can vary from about 0 to about $10^5$ $Nm^3/h$ per square meter of membrane available for separation. Preferably, the flowrate ranges from about $10^{-4}$ to about 10 $Nm^3/h-m^2$. More preferably, the flowrate ranges from about 0.1 to about 0.5 $Nm^3/h-m^2$.

Of course, the particular contacting conditions in each membrane separation unit may be the same or different, depending on various factors including the type of membrane employed as well as the degree of separation or purity desired. The selection of such parameters is within the level of skill of the ordinary worker in this art.

In another preferred embodiment, the process according to the present invention is used to separate $SF_6$ from $CO_2$ and that two or more membrane separation units are employed. Preferably, the gas stream to be separated comprises from about 0.0001 to about 20% by volume of $SF_6$ and from about 0.01 to about 50% by volume of $CO_2$. Also preferably, the gas stream to be separated further comprises at least one of $N_2$, $O_2$, and $H_2O$. More preferably, the gas stream comprises both $N_2$ and $O_2$. An example of such an embodiment of the present invention is shown in FIG. 2.

Figure 2:
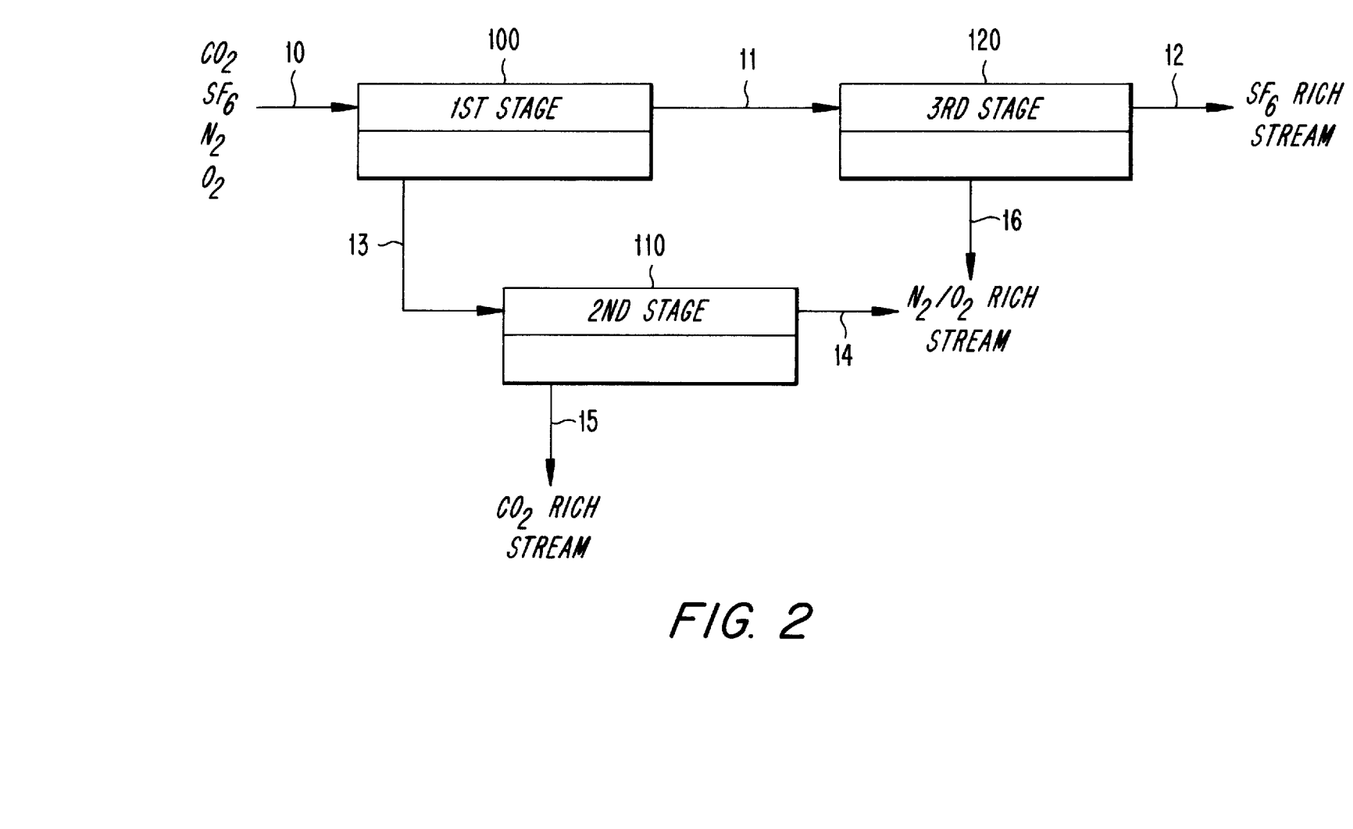
FIG. 2 is a flow diagram of a preferred process for recovering $SF_6$ and $CO_2$ according to the present invention.

Referring to FIG. 2, a gas stream 10 comprising $SF_6$, $CO_2$, $N_2$, and $O_2$ is contacted with a first membrane separation unit 100 at conditions effective to obtain a first retentate stream 11 rich in $SF_6$ and a first permeate stream 13 rich in $CO_2$. The first retentate stream preferably comprises from about 0.01 to about 100% by volume of $SF_6$, and the first permeate stream preferably comprises from about 0.1 to about 90% by volume of $CO_2$.

The first permeate stream 13 is then contacted with a second membrane separation unit 110 at conditions effective to obtain a second retentate stream 14 depleted in $CO_2$ and a second permeate stream 15 rich in $CO_2$. The first retentate stream 11 is contacted with a third membrane separation unit 120 at conditions effective to obtain a third retentate stream 12 rich in $SF_6$ and a third permeate stream 16 depleted in $SF_6$. In addition to being depleted in $SF_6$ and $CO_2$, the second retentate stream 14 and the third permeate stream 16 are rich in at least one of $N_2$ and $O_2$.

The particular membrane used in each membrane separation unit 100, 110, and 120 may be the same or different. The membranes are selected depending on various considerations known to those skilled in the art such as the degree of separation desired.

In a second aspect, the present invention relates to a process for forming solidified Mg metal. The process includes the steps of:

(a) casting molten Mg metal in a gaseous atmosphere comprising $SF_6$;

(b) cooling the molten Mg metal to form a solidified Mg metal;

(c) obtaining a vent gas comprising $SF_6$ and at least one of $N_2$, $O_2$, $CO_2$, and $H_2O$ from the casting step; and (d) contacting the vent gas with a membrane in at least one membrane separation unit at conditions effective to obtain a retentate stream rich in $SF_6$ and a permeate stream rich in at least one of $N_2$, $O_2$, $CO_2$, and $H_2O$. Preferably, at least a portion of the retentate stream is recycled to the casting step to provide at least part of the gaseous atmosphere. Prior to being recycled, the retentate stream can be mixed with at least one of $N_2$, $O_2$, make-up $SF_6$ and $CO_2$.

Figure 3:
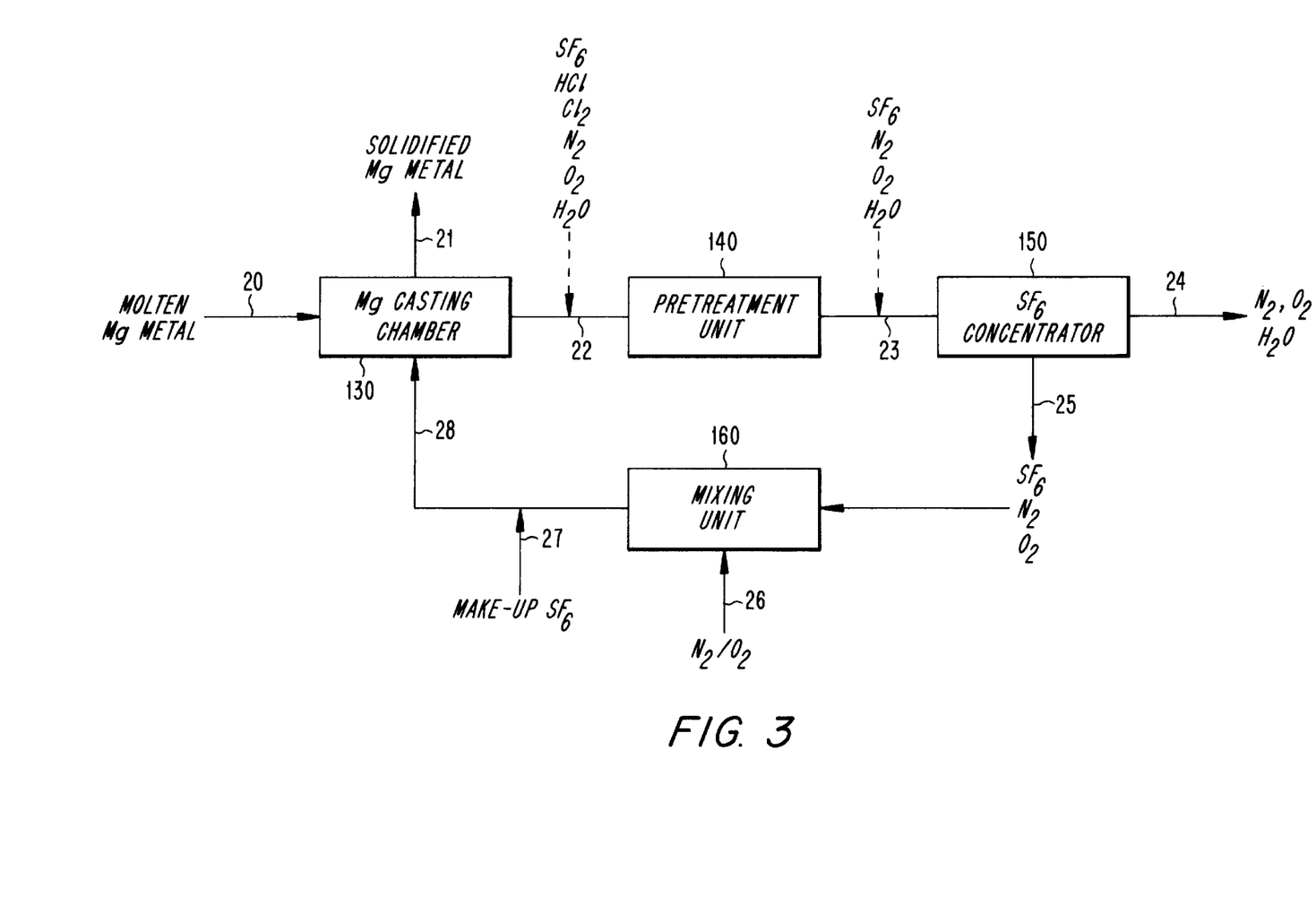
FIG. 3 is a flow diagram of a preferred process for forming solidified Mg metal according to the present invention.

A preferred exemplary embodiment of this process is shown in FIG. 3. Referring to FIG. 3, a stream 20 of molten Mg metal is fed into a casting chamber 130 having a gaseous atmosphere comprising $SF_6$. The molten Mg metal is then cooled to yield a solidified Mg metal which is withdrawn in line 21. The operating conditions and equipment necessary to carry out this step are well known to those skilled in the art.

The gaseous atmosphere in the casting chamber 130 preferably comprises from about 0.01 to about 20% by volume of $SF_6$, and more preferably from about 0.1 to about 10% by volume of $SF_6$. The balance of the gaseous atmosphere can be a mixture of $N_2$ and $O_2$ such as air, as well as other gaseous components including $CO_2$ and $H_2O$.

A vent gas 22 is withdrawn from the casting chamber 130. The vent gas 22 comprises $SF_6$, $N_2$, $O_2$, and $H_2O$, and optionally HCl, $Cl_2$ and particulates. The vent gas 22 typically contains from about 0.0001 to about 0.2% by volume of $SF_6$. If HCl, $Cl_2$, and particulates are present, then the vent gas 22 can be passed to a pretreatment unit 140 to remove these components.

Figure 3A:
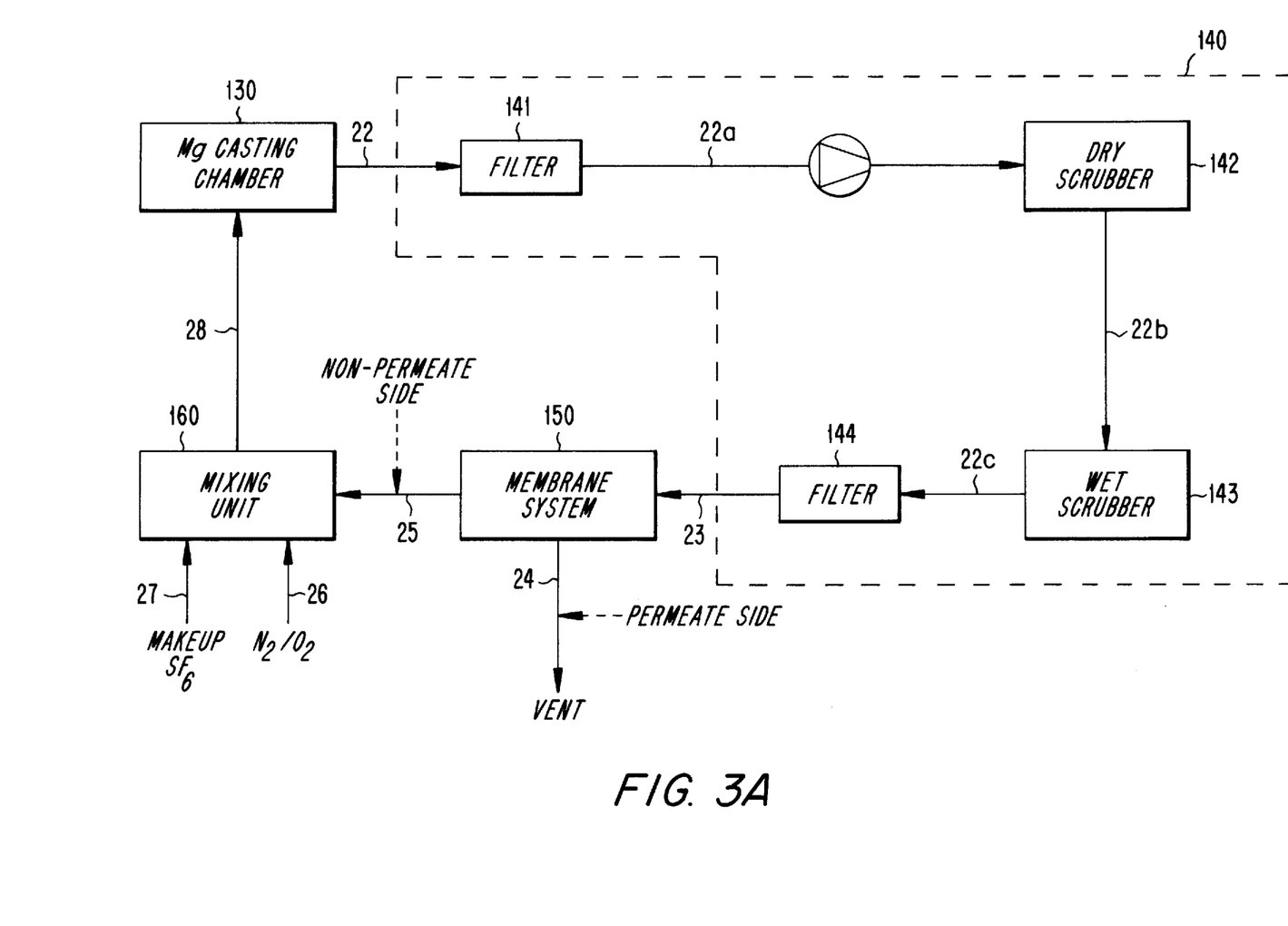
FIG. 3A is a flow diagram of another preferred process for forming solidified Mg metal according to the present invention.

Preferably, as shown in FIG. 3A, the pretreatment unit 140 comprises filters 141 and 144, and a dry scrubber 142 and a wet scrubber 143. The vent gas 22 is passed into filter 141 to remove the particulates. The gas stream 22a exiting the filter 141 is introduced into the dry scrubber 142 to remove some of the halide components. The gas stream 22b exiting the dry scrubber 142 is then transferred to the wet scrubber 143 wherein the remaining halides are removed. The wet scrubber 143 produces a gas stream 22c which is essentially free of the halides. The gas stream 22c is then passed to an additional filter 144 to remove any remaining particulates in the gas stream 22c.

Of course, the particular type of filters and scrubbers employed can be readily determined by those skilled in the art. Also, the number and the relative positions of the filters and scrubbers may vary depending on the desired purity of the resulting gas stream.

By way of example, dry scrubbers are usually resin-type scrubbers or soda-lime. Exemplary wet scrubbers that can be used in the present invention are described in the brochure entitled, "Selecting a CDO™ for Your Particular Application" from DELATECH Corporation, which brochure is hereby incorporated by reference. When various harmful constituents, e.g., halides, have to be removed, it is preferred to use a dry scrubber or scrubbers in series with a wet scrubber or scrubbers.

Preferably, upstream of the scrubber or scrubbers, one or more filters are employed to remove the particulates from the vent gas. It is preferred to use a filter having a pore size diameter of less than 20 micrometers, and more preferably, less than 10 micrometers.

If there are remaining particulates in the purified vent gas before it is passed to the membrane separation unit, it is contemplated by the present invention to employ an additional filter or filters to remove such particulates.

Referring again to FIG. 3, a gas stream 23 comprising $SF_6$, $N_2$, $O_2$, and $H_2O$ is withdrawn from the pretreatment unit 140. The gas stream 23 is then passed to a membrane separation unit 150 to produce a retentate stream 25 rich in $SF_6$ and a permeate stream 24 depleted in $SF_6$. The permeate stream 24, which primarily contains $N_2$, $O_2$, and $H_2O$, can be vented to the atmosphere.

The concentration of $SF_6$ in the retentate stream 25 can be set at a desired level by changing the parameters of the membrane separation unit 150 (e.g., pressure drop across the membrane, temperature, and feed to membrane area ratio). Preferably, the retentate stream 25 comprises from about 30 to about 100% by volume of $SF_6$.

The $SF_6$ concentration of the retentate stream 25 can also be adjusted in a mixing unit 160 wherein the recovered $SF_6$ is mixed with a mixture of $N_2$ and $O_2$ 26, and/or makeup $SF_6$ 27 to yield a recycle stream 28. It should be noted that the ratio of $N_2/O_2$ added to the recycle stream 28 can be adjusted so that the recycle stream 28 can have the desired ratio of the gas constituents. The recycle stream 28 is then passed to the casting chamber 130 to provide at least part of the $SF_6$ gaseous atmosphere.

In another preferred embodiment, the process for forming solidified Mg metal according to the present invention includes the steps of:

(a) casting molten Mg metal in a gaseous atmosphere comprising $SF_6$ and $CO_2$;

(b) cooling the molten Mg metal to form a solidified Mg metal;

(c) obtaining a vent gas comprising $SF_6$ and $CO_2$ from the casting step; and (d) contacting the vent gas with a membrane in two or more membrane separation units at conditions effective to obtain a retentate stream rich in $SF_6$ and a permeate stream rich in $CO_2$. Preferably, at least a portion of the retentate stream and at least a portion of the permeate stream are recycled to the casting step to provide the gaseous atmosphere. More preferably, prior to being recycled, the permeate stream and the retentate stream are contacted with a second and third membrane, respectively, to improve the purity of those streams.

Figure 4:
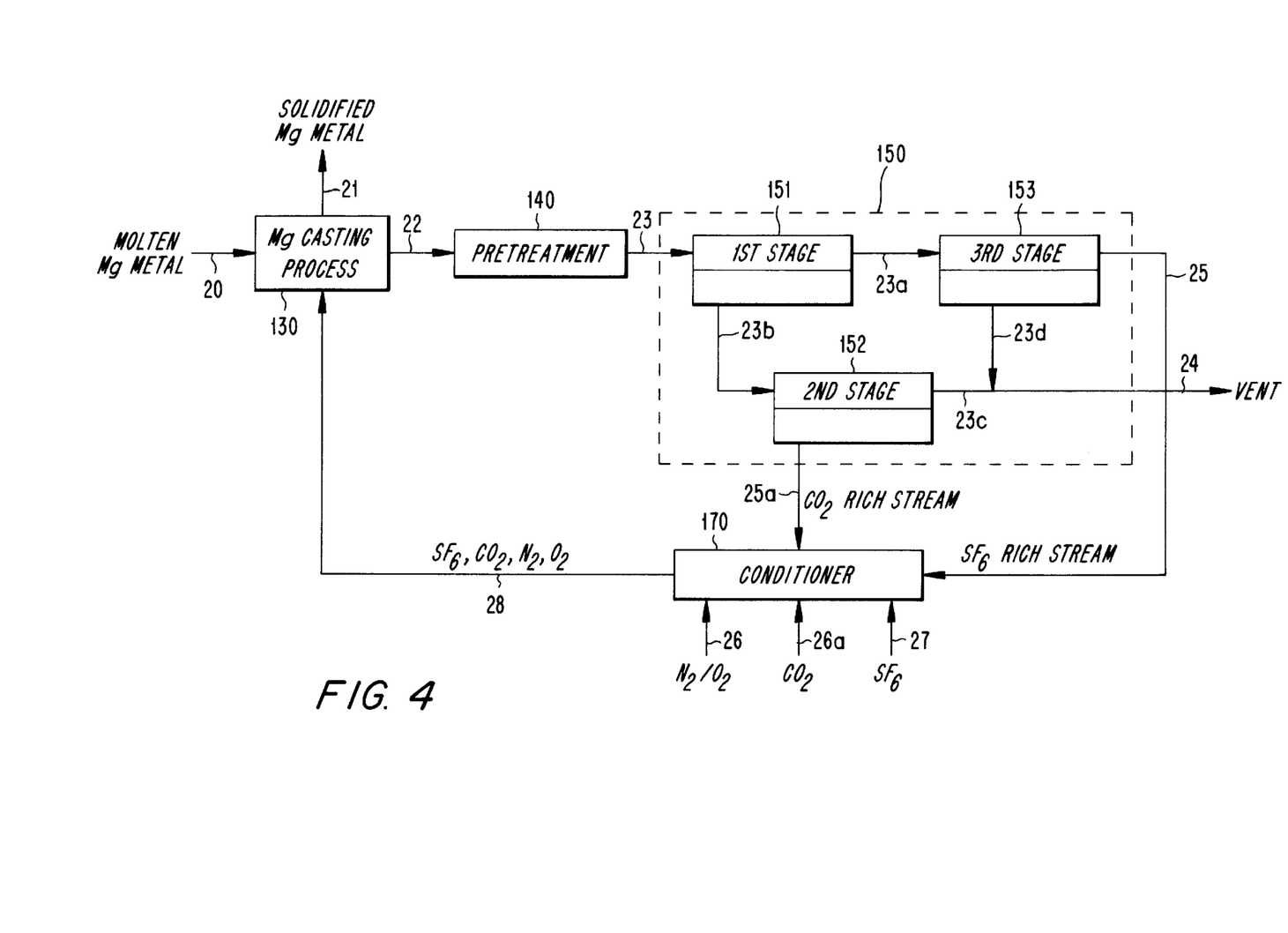
FIG. 4 is a flow diagram of a preferred process for forming solidified Mg metal according to the present invention which incorporates the process for recovering $SF_6$ and $CO_2$ depicted in FIG. 2.

A particularly preferred exemplary embodiment of this process is shown in FIG. 4. Referring to FIG. 4, a stream 20 of molten Mg metal is fed into a casting chamber 130 having a gaseous atmosphere comprising $SF_6$ and $CO_2$. The molten Mg metal is then cooled to yield a solidified Mg metal which is withdrawn in line 21.

The gaseous atmosphere in the casting chamber 130 preferably comprises from about 0.01 to about 20% by volume of $SF_6$ and from about 30 to about 70% by volume of $CO_2$. More preferably, the gaseous atmosphere comprises from about 0.1 to about 10% by volume of $SF_6$ and from about 40 to about 60% by volume of $CO_2$. The balance of the gaseous atmosphere can be a mixture of $N_2$ and $O_2$ such as air, as well as other gaseous components including $H_2O$.

A vent gas 22 is withdrawn from the casting chamber 130. The vent gas 22 comprises $SF_6$, $CO_2$, $N_2$, and $O_2$ and optionally HCl, $Cl_2$, and particulates. The vent gas 22 typically contains about 0.0001 to about 0.2% by volume of $SF_6$ and from about 2 to about 30% by volume of $CO_2$. If HCl, $Cl_2$, and particulates are present, then the vent gas 22 can be passed to a pretreatment unit 140 to remove those components.

A gas stream 23 comprising $SF_6$, $CO_2$, $N_2$, and $O_2$ is then withdrawn from the pretreatment unit 140. The gas stream 23 is passed to a membrane separation system 150 that resembles the configuration depicted in FIG. 2.

Again referring to FIG. 4, the gas stream 23 is contacted with a first membrane separation unit 151 at conditions effective to obtain a first retentate stream 23a rich in $SF_6$ and a first permeate stream 23b rich in $CO_2$. The first retentate stream 23a preferably comprises from about 0.01 to about 100% by volume of $SF_6$, and the first permeate stream 23b preferably comprises from about 0.1 to about 90% by volume of $CO_2$.

The first permeate stream 23b is then contacted with a second membrane separation unit 152 at conditions effective to obtain a second retentate stream 23c depleted in $CO_2$ and a second permeate stream 25a rich in $CO_2$. The first retentate stream 23a is contacted with a third membrane separation unit 153 at conditions effective to obtain a third retentate stream 25 rich in $SF_6$ and a third permeate stream 23d depleted in $SF_6$.

In addition to being depleted in $SF_6$ and $CO_2$, the second retentate stream 23c and the third permeate stream 23d are rich in at least one of $N_2$ and $O_2$. These streams can been combined to form a purified vent stream 24.

The second permeate stream 25a and the third retentate stream 25 can be mixed together in a conditioner unit 170 along with a mixture of $N_2$ and $O_2$ 26, and make-up $CO_2$ 26a and make-up $SF_6$ 27 to form a recycle stream 28. Again, the ratio of $N_2/O_2$ can be adjusted to obtain any desired concentration in the recycle stream 28. The recycle stream 28 is passed to the casting chamber 130 to provide at least part of the $N_2/O_2/SF_6/CO_2$ gaseous atmosphere.

EXAMPLES

The following examples are provided to illustrate the present invention and are not to be construed as a limitation thereof.

EXAMPLE 1

Figure 5:
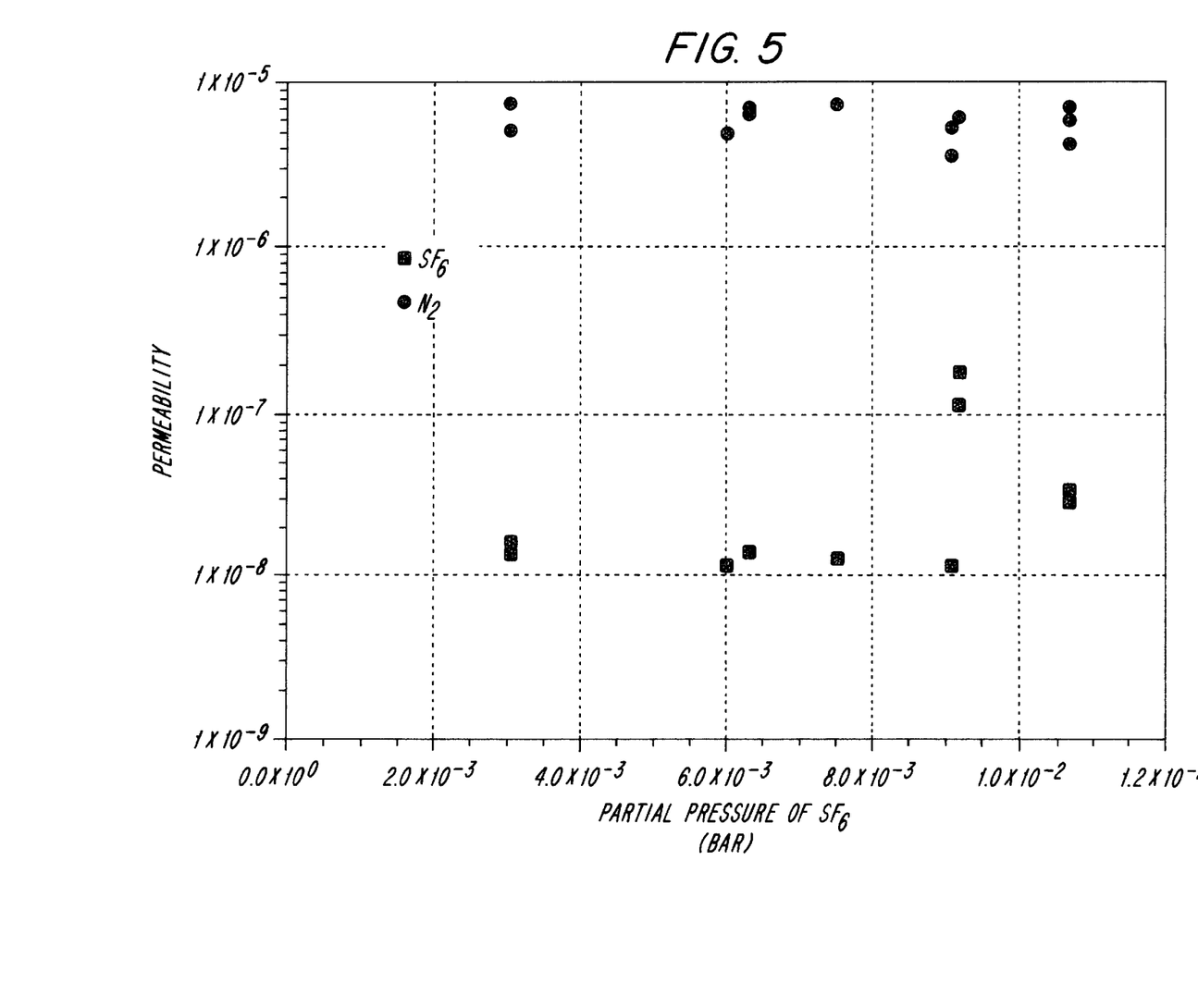
FIG. 5 is a graph showing the permeability of $N_2$ and $SF_6$ through a particular membrane at different partial pressures of $SF_6$.

A gas stream comprising $SF_6$ and $N_2$ was contacted with an asymmetric composite hollow fiber membrane with a surface area of 0.13 $m^2$ at various partial pressures of $SF_6$ to determine its permeability relative to $N_2$. The gas stream was contacted with the membrane at a temperature of 20° C. and at a flowrate rate of 200 sccm. The pressure of the feed gas was kept at 3 bar. The permeability of each of these components is graphically shown in FIG. 5. As seen from FIG. 5, the selectivity of $SF_6/N_2$ is on the order of 500.

Based on the above selectivity, a computer simulation of a single stage membrane separation unit was conducted. The concentration and the pressure of the feed, permeate, and retentate as well as the percentage recovery of $SF_6$ are shown in Table 1 below.

TABLE 1

|  | Feed | Permeate | Retentate | $SF_6$ Recovery |
|---|---|---|---|---|
| Flowrate ($Nm^3$/h-$m^2$) | 0.19 | 0.15 | 0.04 |  |
| [$SF_6$] (vol %) | 0.01 | 9.2 × 10$^{-5}$ | 1 |  |
| [$N_2$] (vol %) | 99.99 | 99.99991 | 0 |  |
| Pressure (bar) | 9 | 1 | 8.7 |  |
|  |  |  |  | 99.7% |

EXAMPLE 2

In an actual experiment, a gas stream comprising 0.1% by volume of $SF_6$ and the balance air was contacted with an asymmetric composite hollow fiber membrane with a surface area of 690 $m^2$ at a temperature of 20° C. in a cascade design process as shown in FIG. 1 wherein n=1 and m=0. The flowrate, concentration, and pressure of the feed, permeate, and retentate streams are reported below in Table 2. The percentage recovery of $SF_6$ is also reported in Table 2.

TABLE 2

|  | Feed | Permeate | Retentate | $SF_6$ Recovery |
|---|---|---|---|---|
| Flowrate (scfh) | 447.7 | 443.62 | 4.08 |  |
| [$SF_6$] (vol %) | 0.100 | 0.0075 | 10.0670 |  |
| Pressure (bar) | 5.6 | 1 | 5.5 |  |
|  |  |  |  | 92.3% |

EXAMPLE 3

In a computer simulation, a gas stream comprising $SF_6$, $CO_2$, and air is passed to a three-stage membrane separation system as shown in FIG. 2 to recovery both $SF_6$ and $CO_2$. The membrane in each stage is the same asymmetric composite hollow fiber membrane and the contacting temperature in each stage is 20° C. The flowrate, concentration, and pressure of the feed, permeate, and retentate streams of each stage are reported below in Table 3. The percentage recovery of $SF_6$ and $CO_2$ is also reported in Table 3.

TABLE 3

|  | Feed | Permeate | Retentate | Recovery |
|---|---|---|---|---|
| First Stage |  |  |  |  |
| Flowrate ($Nm^3$/h-$m^2$) | 0.25 | 0.21 | 0.04 |  |
| [$SF_6$] (vol %) | 0.02 | 0.00 | 0.12 | 100% |
| [$CO_2$] (vol %) | 5.00 | 6.00 | 9.00 | 100% |
| [$N_2$] (vol %) | 75.98 | 71.19 | 99.86 |  |
| [$O_2$] (vol %) | 19.00 | 22.81 | 0.02 |  |
| Pressure (bar) | 9 | 0.5 | 8.7 |  |
| Second Stage |  |  |  |  |
| Flowrate ($Nm^3$/h-$m^2$) | 0.63 | 0.23 | 0.40 |  |
| [$SF_6$] (vol %) | 0.00 | 0.00 | 0.00 |  |
| [$CO_2$] (vol %) | 6.00 | 16.68 | 0.07 | 99.3% |
| [$N_2$] (vol %) | 71.19 | 46.11 | 85.11 |  |
| [$O_2$] (vol %) | 22.81 | 37.21 | 14.82 |  |
| Pressure (bar) | 8 | 0.9 | 7.7 |  |
| Third Stage |  |  |  |  |
| Flowrate ($Nm^3$/h-$m^2$) | 0.1270 | 0.1266 | 0.0004 |  |
| [$SF_6$] (vol %) | 0.12 | 0.00 | 34.96 | 99% |
| [$CO_2$] (vol %) | 0.00 | 0.00 | 0.00 |  |
| [$N_2$] (vol %) | 99.86 | 99.98 | 65.04 |  |
| [$O_2$] (vol %) | 0.02 | 0.02 | 0.00 |  |
| Pressure (bar) | 6.98 | 0.2 | 6.68 |  |

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for forming solidified Mg metal, said process comprising the steps of:

(a) casting molten Mg metal in a gaseous atmosphere comprising $SF_6$;

(b) cooling said molten Mg metal to form a solidified Mg metal;

(c) obtaining a vent gas comprising $SF_6$ and at least one of $N_2$, $O_2$, $CO_2$, and $H_2O$ from said casting step; and (d) contacting said vent gas with a membrane in at least one membrane separation unit at conditions effective to obtain a retentate stream rich in $SF_6$ and a permeate stream rich in at least one of $N_2$, $O_2$, $CO_2$, and $H_2O$.

2. The process according to claim 1, wherein said gaseous atmosphere comprises from about 0.1 to about 10% by volume of $SF_6$.

3. The process according to claim 1, wherein said vent gas comprises from about 0.0001 to about 0.2% by volume of $SF_6$.

4. The process according to claim 1, wherein said retentate stream comprises from about 5 to about 100% by volume of $SF_6$.

5. The process according to claim 1, wherein said conditions comprise a temperature between about 10° and about 80° C., a pressure drop between about 3 and about 200 psig, and a flowrate rate between about $10^{-4}$ and about 10 $Nm^3/h-m^2$.

6. The process according to claim 1, wherein said membrane is selected from the group consisting of polyimides, polyamides, polyamide-imides, polyesters, polycarbonates, polysulfones, polyethersulfone, polyetherketone, alkyl substituted aromatic polyesters, and blends of polyethersulfone, aromatic polyimides, aromatic polyamides, polyamides-imides, fluorinated aromatic polyimide, polyamide, and polyamide-imides.

7. The process according to claim 1, wherein said vent gas is contacted with said membrane in two or more membrane separation units.

8. The process according to claim 1, wherein said vent gas additionally comprises at least one of HCl and $Cl_2$, and wherein said vent gas is contacted with at least one caustic scrubber to remove said at least one of HCl and $Cl_2$ from said vent gas prior to contacting with said membrane.

9. The process according to claim 1, wherein said vent gas additionally comprises particulates, and wherein said vent gas is contacted with at least one filter to remove said particulates from said vent gas prior to contacting with said membrane.

10. The process according to claim 1, wherein at least a portion of said retentate stream is recycled to said casting step to provide said gaseous atmosphere.

11. The process according to claim 10, wherein said retentate stream is mixed with a mixture of $N_2$ and $O_2$ prior to being recycled to said casting step.

12. A process for forming solidified Mg metal, said process comprising the steps of:

(a) casting molten Mg metal in a gaseous atmosphere comprising $SF_6$ and $CO_2$;

(b) cooling said molten Mg metal to form a solidified Mg metal;

(c) obtaining a vent gas comprising $SF_6$ and $CO_2$ from said casting step; and (d) contacting said vent gas with a membrane in two or more membrane separation units at conditions effective to obtain a retentate stream rich in $SF_6$ and a permeate stream rich in $CO_2$.

13. The process according to claim 12, wherein said gaseous atmosphere comprises from about 0.1 to about 10% by volume of $SF_6$ from about 40 to about 60% by volume of $CO_2$, and the balance $N_2$ and $O_2$.

14. The process according to claim 12, wherein said vent gas comprises from about 0.0001 to about 0.2% by volume of $SF_6$ and from about 2 to about 30% by volume of $CO_2$.

15. The process according to claim 12, wherein said retentate stream comprises from about 0.01 to about 100% by volume of $SF_6$, and said permeate stream comprises from about 0.1 to about 90% by volume of $CO_2$.

16. The process according to claim 12, wherein said conditions in each membrane separation unit comprise a temperature between about 10° and about 80° C., a pressure drop between about 3 and about 200 psig, and a flowrate rate between about $10^{-4}$ and about 10 $Nm^3/h-m^2$.

17. The process according to claim 12, wherein said membrane is selected from the group consisting of polyimides, polyamides, polyamide-imides, polyesters, polycarbonates, polysulfones, polyethersulfone, polyetherketone, alkyl substituted aromatic polyesters, and blends of polyethersulfone, aromatic polyimides, aromatic polyamides, polyamides-imides, fluorinated aromatic polyimide, polyamide, and polyamide-imides.

18. The process according to claim 12, wherein said vent gas additionally comprises at least one of HCl and $Cl_2$, and wherein said vent gas is contacted with at least one caustic scrubber to remove said at least one of HCl and $Cl_2$ from said vent gas prior to contacting with said membrane.

19. The process according to claim 12, wherein said vent gas additionally comprises particulates, and wherein said vent gas is contacted with at least one filter to remove said particulates from said vent gas prior to contacting with said membrane.

20. The process according to claim 12, wherein at least a portion of said retentate stream and at least a portion of said permeate stream are recycled to said casting step to provide said gaseous atmosphere.

21. The process according to claim 20, wherein said retentate stream and said permeate stream are mixed with a mixture of $N_2$ and $O_2$ prior to being recycled to said casting step.

22. A process for forming solidified Mg metal, said process comprising the steps of:

(a) casting molten Mg metal in a gaseous atmosphere comprising $SF_6$ and $CO_2$;

(b) cooling said molten Mg metal to form a solidified Mg metal;

(c) obtaining a vent gas comprising $SF_6$ and $CO_2$ from said casting step;

(d) contacting said vent gas with a first membrane in a first membrane separation unit at conditions effective to obtain a first retentate stream rich in $SF_6$ and a first permeate stream rich in $CO_2$;

(e) contacting said first permeate stream with a second membrane in a second membrane separation unit at conditions effective to obtain a second retentate stream depleted in $CO_2$ and a second permeate stream rich in $CO_2$; and (f) contacting said first retentate stream with a third membrane in a third membrane separation unit at conditions effective to obtain a third retentate stream rich in $SF_6$ and a third permeate stream depleted in $SF_6$.

23. The process according to claim 22, wherein at least a portion of said second permeate stream and at least a portion of said third retentate stream are recycled to said casting step to provide said gaseous atmosphere.

24. The process according to claim 22, wherein said second permeate stream and said third retentate stream are mixed with a mixture of $N_2$ and $O_2$ prior to being recycled to said casting step.

* * * * *

UNITED STATES PATENT AND TRADEMARK OFFICE
CERTIFICATE OF CORRECTION

PATENT NO. : 5,855,647
DATED : January 5, 1999
INVENTOR(S) : Yao-En Li et al.

It is certified that error appears in the above-indentified patent and that said Letters Patent is hereby corrected as shown below:

Column 11, claim 9, line 2, please delete "," after vent.

Column 11, claim 13, line 3, please insert --,-- after $SF_6$.

Signed and Sealed this

Twenty-fifth Day of May, 1999

Attest:

Q. TODD DICKINSON

*Attesting Officer*    Acting Commissioner of Patents and Trademarks